United States Patent
Weng

(10) Patent No.: US 10,721,458 B1
(45) Date of Patent: Jul. 21, 2020

(54) STEREOSCOPIC DISTANCE MEASUREMENTS FROM A REFLECTING SURFACE

(71) Applicant: Ambarella International LP, Santa Clara, CA (US)

(72) Inventor: Ching-Yu Weng, Hsinchu (TW)

(73) Assignee: Ambarella International LP, Santa Clara, CA (US)

( * ) Notice: Subject to any disclaimer, the term of this patent is extended or adjusted under 35 U.S.C. 154(b) by 60 days.

(21) Appl. No.: 16/220,271

(22) Filed: Dec. 14, 2018

(51) Int. Cl.
*G06K 9/00* (2006.01)
*H04N 13/239* (2018.01)
*H04N 13/271* (2018.01)
*G02B 5/26* (2006.01)
(Continued)

(52) U.S. Cl.
CPC ........... *H04N 13/239* (2018.05); *G01B 11/14* (2013.01); *G01B 11/22* (2013.01); *G02B 5/26* (2013.01); *H04N 13/271* (2018.05)

(58) Field of Classification Search
CPC ........... G06K 9/00798; G06K 9/00791; G06K 9/00805; G06K 9/209; G06K 9/00362; G06K 9/00624; G06K 9/00671; G06K 9/00825; H04N 5/23229; H04N 5/225; H04N 5/2258; H04N 5/232; H04N 5/238; H04N 5/2254; H04N 5/2256; H04N 13/243; H04N 13/133; H04N 13/25; H04N 13/271; H04N 5/2173; H04N 5/2226; H04N 5/23232; H04N 5/2352; H04N 7/183; H04N 9/04515; G06T 2207/30256; G06T 5/50; G06T 7/73; G06T 1/00; G06T 2207/10004; G06T 2207/10021; G06T 2207/20036; G06T 2207/20061; G06T 2207/20076; G06T 2207/20212; G06T 2207/30181; G06T 2207/30196; G06T 2207/30236; G06T 2207/30252; G06T 3/4053; G06T 5/005; G06T 5/009; G06T 5/40; G06T 7/136; G06T 7/246; G06T 7/248; G06T 7/593; G06T 7/70; G06T 7/74; B60J 10/00; B60N 2002/0268; B60N 2002/0272; B60N 2/0232; B60N 2/0244; B60N 2/0248; B60N 2/0252; B60N 2/0276
See application file for complete search history.

(56) References Cited

U.S. PATENT DOCUMENTS 7,415,126 B2 * 8/2008 Breed ...................... B60J 10/00
382/100
7,688,363 B2 * 3/2010 Sato ...................... G06T 3/4053
348/240.2

(Continued)

*Primary Examiner* — Ian L Lemieux
(74) *Attorney, Agent, or Firm* — Christopher P. Maiorana, PC

(57) ABSTRACT

An apparatus includes a plurality of optical filters, a stereo camera and a circuit. The optical filters may be configured to (i) generate polarized light by polarizing light received from a reflective surface and (ii) rotate in synchronization to each other. The stereo camera may be disposed adjacent the optical filters and may be configured to generate two sequences of images in electrical form from the polarized light. The circuit may be configured to (i) generate a sequence of disparity images from the two sequences of images and (ii) adjust the rotation of the optical filters in response to the sequence of disparity images.

18 Claims, 6 Drawing Sheets

(51) Int. Cl.
*G01B 11/22* (2006.01)
*G01B 11/14* (2006.01)

(56) References Cited

U.S. PATENT DOCUMENTS

| | | | | |
|---|---|---|---|---|
| 8,184,194 | B2* | 5/2012 | Sato | G02B 27/283 |
| | | | | 348/335 |
| 8,824,779 | B1* | 9/2014 | Smyth | G06K 9/0061 |
| | | | | 382/100 |
| 8,831,286 | B2* | 9/2014 | Li | H04N 5/2254 |
| | | | | 382/103 |
| 8,983,126 | B2* | 3/2015 | Liu | G06K 9/00798 |
| | | | | 382/103 |
| 9,269,006 | B2* | 2/2016 | Ishigaki | G06K 9/00825 |
| 9,423,484 | B2* | 8/2016 | Aycock | G01S 3/7861 |
| 9,489,728 | B2* | 11/2016 | Imagawa | G06T 5/005 |
| 10,628,960 | B2* | 4/2020 | Watanabe | G06T 7/246 |
| 2010/0283837 | A1* | 11/2010 | Oohchida | H04N 13/239 |
| | | | | 348/47 |
| 2011/0267483 | A1* | 11/2011 | Kanamori | H04N 5/2256 |
| | | | | 348/220.1 |
| 2012/0242835 | A1* | 9/2012 | Li | G06K 9/00798 |
| | | | | 348/148 |
| 2012/0307132 | A1* | 12/2012 | Fan | H04N 5/2258 |
| | | | | 348/348 |
| 2016/0261844 | A1* | 9/2016 | Kadambi | G01B 11/24 |
| 2016/0261852 | A1* | 9/2016 | Hirasawa | G01C 11/30 |
| 2017/0131718 | A1* | 5/2017 | Matsumura | G05D 1/021 |
| 2017/0366802 | A1* | 12/2017 | Hirasawa | G01B 11/24 |
| 2018/0268246 | A1* | 9/2018 | Kondo | G06K 9/209 |
| 2019/0260974 | A1* | 8/2019 | Kaizu | H04N 5/225 |
| 2019/0273856 | A1* | 9/2019 | Hirasawa | H04N 5/232 |
| 2019/0374289 | A1* | 12/2019 | Stawiaski | A61B 34/20 |

* cited by examiner

STEREOSCOPIC DISTANCE MEASUREMENTS FROM A REFLECTING SURFACE

FIELD OF THE INVENTION

The invention relates to stereo vision generally and, more particularly, to a method and/or apparatus for implementing a stereoscopic distance measurement from a reflecting surface.

BACKGROUND

Conventional stereo camera systems used to estimated distances have problems with surfaces that reflect images. For example, when a puddle exists in a scene, an unexpected and invalid reflection can result in an incorrect distance estimated at the puddle. In some situations, an object in the puddle becomes completely obscured and cannot be seen by the stereo camera system.

It would be desirable to implement a stereoscopic distance measurement from a reflecting surface.

SUMMARY

The invention concerns an apparatus including a plurality of optical filters, a stereo camera and a circuit. The optical filters may be configured to (i) generate polarized light by polarizing light received from a reflective surface and (ii) rotate in synchronization to each other. The stereo camera may be disposed adjacent the optical filters and may be configured to generate two sequences of images in electrical form from the polarized light. The circuit may be configured to (i) generate a sequence of disparity images from the two sequences of images and (ii) adjust the rotation of the optical filters in response to the sequence of disparity images.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a stereoscopic distance measurement from a reflecting surface that may (i) be immune to distortions caused by reflective surfaces, (ii) automatically correct for changing reflective conditions, (iii) enhance a contrast of images captures by a stereo camera and/or (iv) be implemented using one or more integrated circuits.

Embodiments of the invention generally mount multiple (e.g., two) rotatable optical filters before multiple (e.g., two) lenses, respectively, of a stereoscopic camera. The optical filters may reduce glare and reflections in frames (or images, or pictures, or fields) captured by the camera. The optical filters may be polarizing filters mechanically coupled to rotate in synchronization with each other. The polarizing filters may be rotated to adjust an angle of polarization. By rotating the filters to a proper angle, the reflecting effect of a shiny surface may be reduced or minimized. The angle of polarization may be controlled by a control circuit. A hunting technique performed by the control circuit may be used to determine an appropriate angle for the filters to account for the polarized reflective light.

Figure 1:
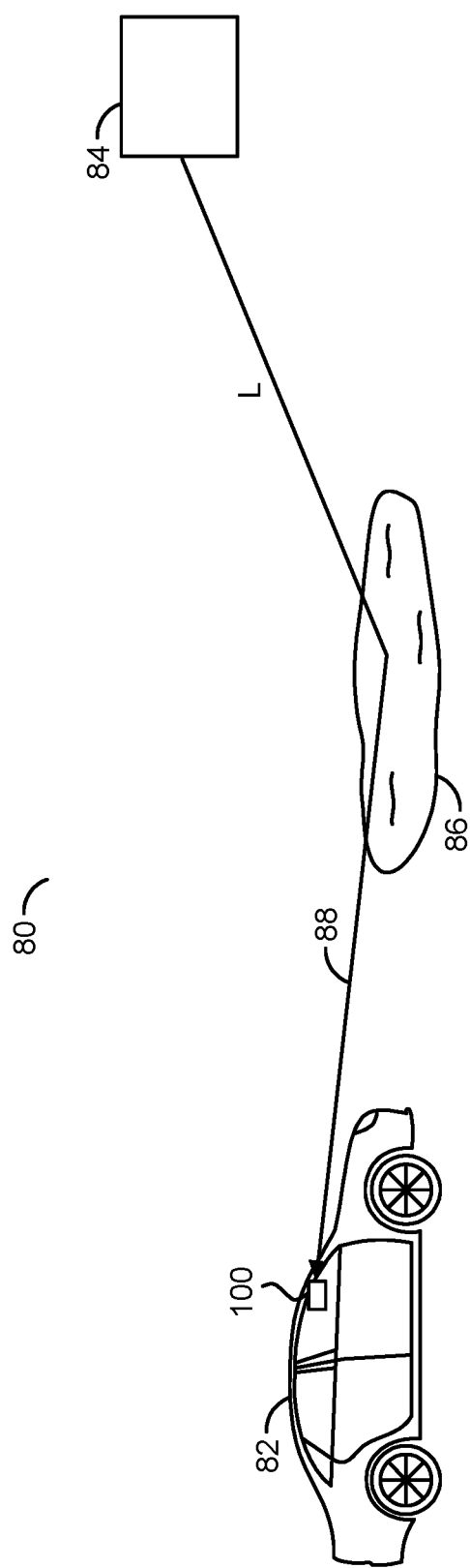
FIG. 1 is a block diagram of a system in accordance with an embodiment of the invention.

Referring to FIG. 1, a block diagram of a system 80 is shown in accordance with an embodiment of the invention. The system 80 generally comprises a platform 82, an object 84, a surface 86, a path 88, and a block (or circuit) 100. The circuit 100 may be mounted inside and/or on the platform 82. The circuit 100 may be implemented in hardware, software, firmware or any combination thereof in an apparatus. In some embodiments, the circuit 100 may be a stereo digital video camera, a stereo digital still camera or a hybrid stereo digital video/still camera. In various embodiments, the circuit 100 may be implemented using one or more integrated circuits. A signal (e.g., L) may be a light signal moving from the object 84, reflecting off the surface 86 and being received by the circuit 100.

The platform 82 may implement a mobile vehicle. The vehicle 82 may include, but is not limited to, an automobile, a truck, a train, a boat or similar vehicles. The vehicle 82 is generally operational to move about a ground surface and/or a water surface. Due to the motion, the vehicle 82 may detect one or more distances from itself to one or more points on the surface. The distances may be determined using a sequence of disparity images.

The object 84 may represent one or more sources of the light L that reflects from the surface 86. In various conditions, the object 84 may be a light source and/or a structure. The light sources may include, but are not limited to, the sun, the moon, a street lamp, a traffic signal, or the like. The structures may include any items that may reflect an ambient light.

The surface 86 may represent one or more reflective surfaces. The surface 86 may include, but is not limited to, puddles, shiny surfaces, mirrors, other vehicles, glass windows and the like. The surface 86 may be oriented horizontally, vertically, a combination of horizontally and vertically. The surface 86 may be located on and/or above a roadway on which the vehicle 82 is traveling. The surface 86 may also be located to a side of the roadway.

The path 88 may extend between the object 84 and the circuit 100 and includes at least one reflection off at least one surface 86. The path 88 may be simple, as illustrated in FIG. 1. Other paths 88 may be experienced based on an environment surrounding the vehicle 82.

The circuit 100 may implement a stereoscopic camera system (or camera system for short). The camera system 100 may be operational to estimate distances to objects within a field of view based on one or more disparity images among a sequence of disparity images. The disparity images may be generated by multiple (e.g., two) electro-optical sensors and a processor. A pair of optical polarizing filters may be mounted in the field of view of the electro-optical sensors. The optical polarizing filters may be rotated in synchronization with each other to adjust a filtering of the glare and reflections in the field of view. The estimated distances may be provided to a driver and/or other circuitry within the vehicle, such as automatic collision detection circuitry.

Figure 2:
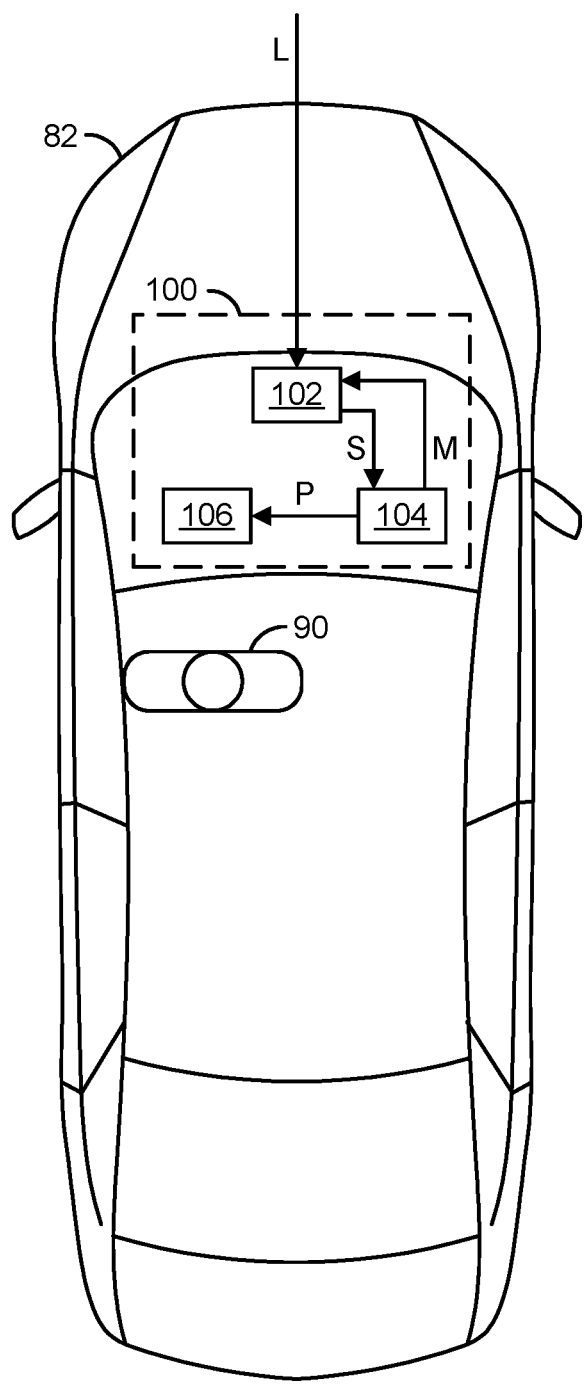
FIG. 2 is a diagram illustrating a camera system in accordance with an example embodiment of the invention.

Referring to FIG. 2, a diagram illustrating an example implementation of the camera system 100 is shown in accordance with an example embodiment of the invention. The camera system (or apparatus) 100 generally comprises a block (or circuit) 102, a block (or circuit) 104 and a block (or circuit) 106. The circuits 102-106 may be implemented in hardware, software, firmware or any combination thereof in an apparatus. In various embodiments, the circuits 102-106 may be implemented using one or more integrated circuits.

A signal (e.g., S) may be generated by the circuit 102 and transferred to the circuit 104. The signal S may convey multiple (e.g., two) sequences of sensed images (or video) captured by the circuit 102. The sequences of images may be in electrical form. The images may represent the environment in the field of view of the circuit 102. A signal (e.g., M) may be generated by the circuit 104 and presented to the circuit 102. The signal M may convey motor controls used to change an angle of the polarizing filters in the circuit 102. A signal (e.g., P) may be generated by the circuit 104 and transferred to the circuit 106. The signal P may convey processed information extracted and/or created from the sequence of images.

The circuit 102 may implement a stereo camera circuit. The circuit 102 is generally operational to generate the signal S based on the light signal L received from the surrounding environment. The circuit 102 may also be operational to rotate the polarization filters in response to the motor control signal M.

The circuit 104 may implement one or more processor circuits. The circuit 104 may process the images in the signal S to create a sequence of disparity images. Improvements may be made to the disparity images by adjusting the angle of the polarization filers in the circuit 102. The angle of the polarization filters may be controlled by the circuit 104 through the signal M. The improvements may be based on an analysis of a quality of the disparity images. A hunting technique (or method or process) may be performed by the circuit 104 to enhance the quality of the disparity images. The disparity images, distance estimations and other metrics extracted from the images may be presented in the signal P to the circuit 106.

The circuit 106 may implement additional circuitry in the vehicle 82. The circuitry 106 is generally responsive to the information received in the signal P. The circuitry 106 may include, but is not limited to, display circuitry, a display viewable by a driver 90 of the vehicle 82 and/or driver assist circuitry. The driver assist circuitry may include, but is not limited to, collision avoidance circuitry, navigation circuitry, anti-lock braking circuitry, adaptive steering circuitry, automatic parking circuitry, autonomous driving circuitry, stability control circuitry, automatic braking circuitry and the like.

Figure 3:
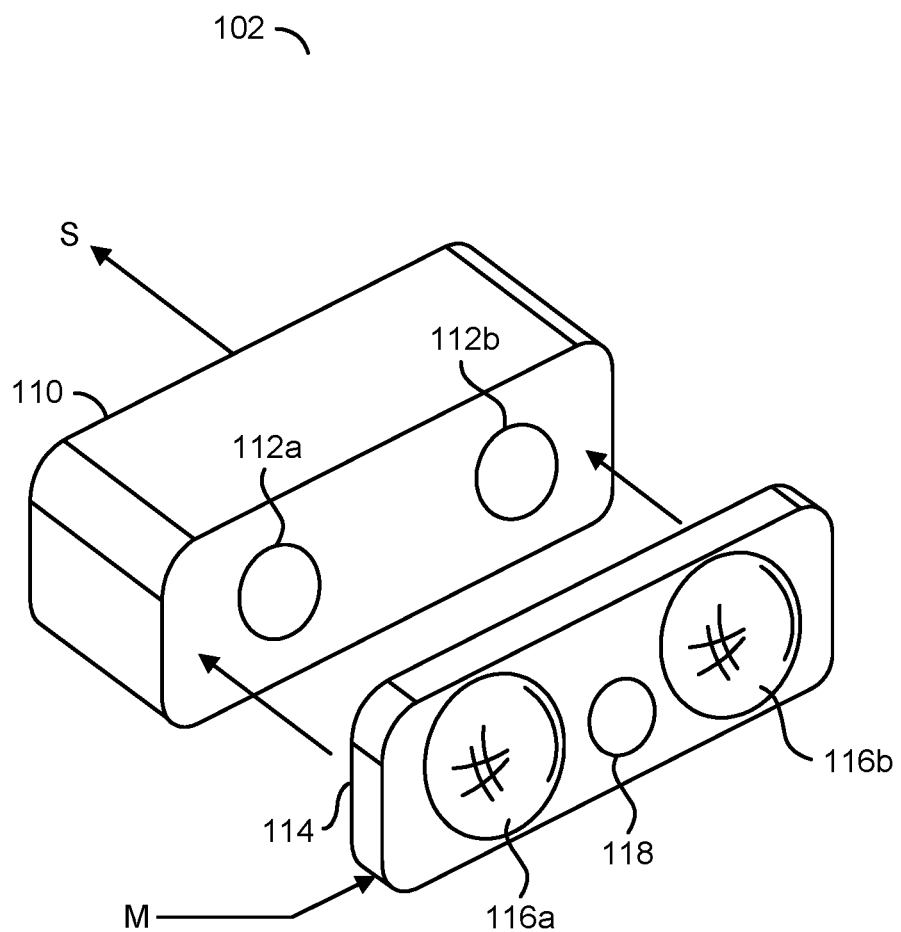
FIG. 3 is a diagram illustrating a stereo camera in accordance with an example embodiment of the invention.

Referring to FIG. 3, a diagram illustrating an example implementation of the circuit 102 is shown in accordance with an example embodiment of the invention. The circuit 102 generally comprises a block (or circuit) 110, multiple (e.g., two) lenses 112a-112b, a block (or circuit) 114, multiple (e.g., two) optical filters 116a-116b and a motor (or actuator) 118. The circuits 110 and 114 may be implemented in hardware, software, firmware or any combination thereof in an apparatus. In various embodiments, the circuits 110 and 114 may be implemented using one or more integrated circuits.

The circuit 110 may generate the signal S. The circuit 114 may receive the signal M. The optical filters 116a-116b may pass the light signal L to the circuit 110.

The circuit 110 may implement a main body of the stereo camera 102. The circuit 110 may include multiple (e.g., two) calibrated sensors. In various embodiments, the circuit 110 may include the lenses 112a-112b. In some embodiments, the lenses 112a-112b may be separate parts optically aligned to the circuit 110.

The circuit 114 may implement an adjustable filter body of the stereo camera 102. The circuit 114 may mount the optical filters 116a-116b in a common plane. The circuit 114 may also mount the motor 118. The circuit 114 may be attached to or disposed neighboring the circuit 110 such that the optical filters 116a-116b are positioned before the lenses 112a-112b. The circuit 114 may include mechanical linkages that allow the motor 118 to rotate the optical filters 116a-116b about respective axes perpendicular to the common plane.

Each optical filter 116a-116b may implement a polarizing filter. In various embodiments, the filters 116a-116b may be circular polarizing filters to allow for through-the-lens metering and auto focus operations. In some embodiments, the filters 116a-116b may be linear polarizing filters. The polarization features of the optical filter 116a-116b may be spatially aligned with each other at all angles to provide the same polarization.

Figure 4:
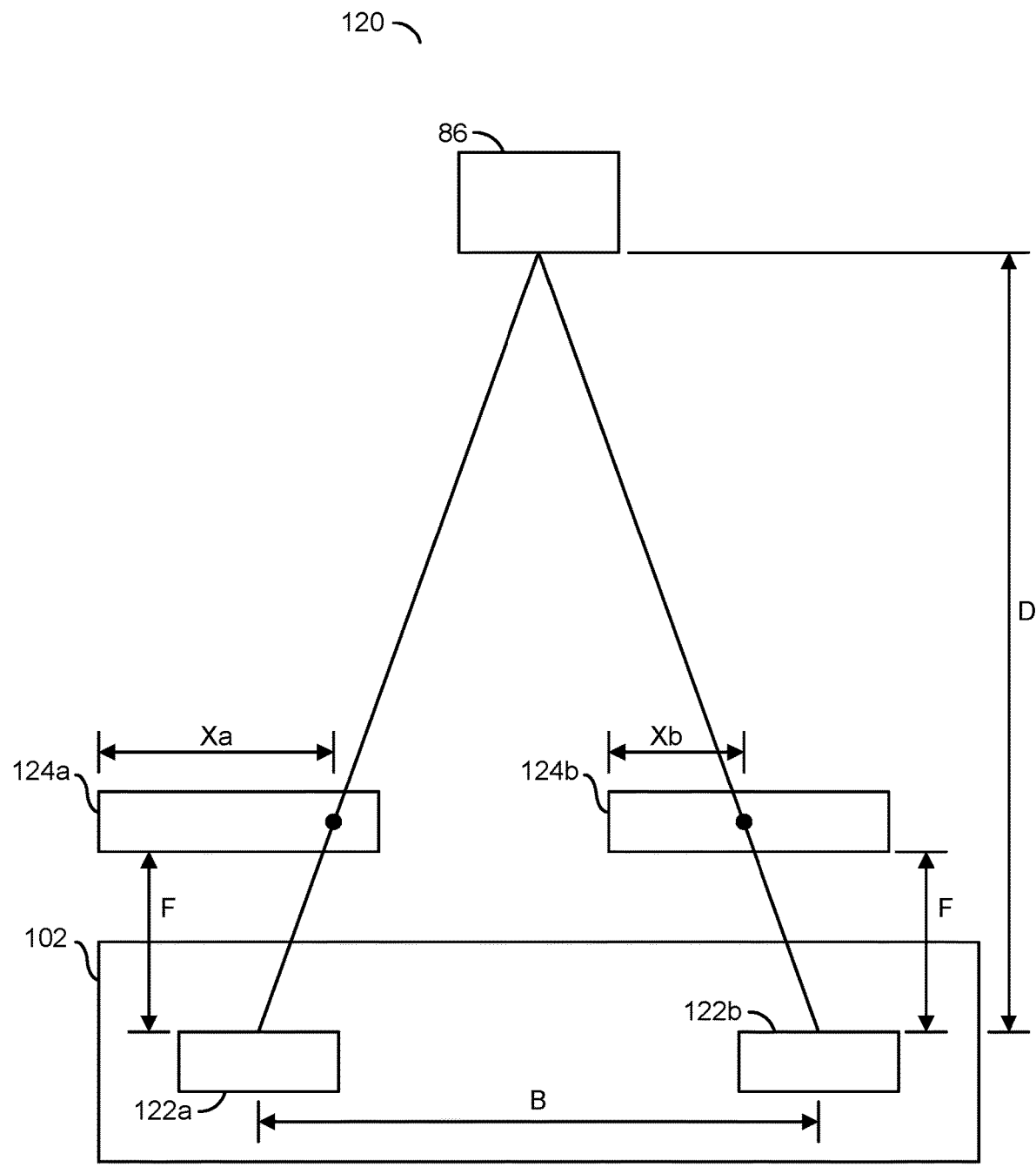
FIG. 4 is a diagram illustrating a distance estimation in accordance with an example embodiment of the invention.

Referring to FIG. 4, a diagram illustrating an example distance estimation 120 is shown in accordance with an example embodiment of the invention. The estimation 120 may be made between the circuit 102 and the surface 86. The circuit 102 may include multiple blocks (or circuits) 122a-122b.

Each circuit 122a-122b may implement an electro-optical sensor. The sensors 122a-122b are generally operational to generate the images in the signal S. In various embodiments, the sensors 122a-122b may be implemented as solid-state sensors. Other types of sensors may be implemented to meet the design criteria of a particular application.

The sensor 122a and 122b may be separated from each other by a spacing (e.g., B). Each sensor 122a-122b may have an image plane 124a-124b at a focal distance (e.g., F). The surface 86 may be at a distance (e.g., D) from the sensors 122a-122b. The surface 86 may be within a respective field of view of each sensor 122a-122b.

The sensor 122a may sense a point (or area) of interest in the surface 86 at a location within the image plane 124a. The location may be offset from a reference point in the image plane 124a by a distance in each dimension (e.g., distance Xa illustrated in one dimension). The sensor 122b may sense the point (or area) of interest in the surface 86 at a corresponding location within the image plane 124b. The corresponding location may be offset from a similar reference point in the image plane 124b by a distance in each dimension (e.g., distance Xb illustrated in one dimension). A disparity of the point of interest may be determined in a single dimension by formula 1 as follows:

$$\text{Disparity} = Xa - Xb \quad (1)$$

The distance D to the surface 86 may be determined from a disparity image based on the disparity of formula 1 using formula 2 as follows:

$$D = B \times F / \text{Disparity} \quad (2)$$

Figure 5:
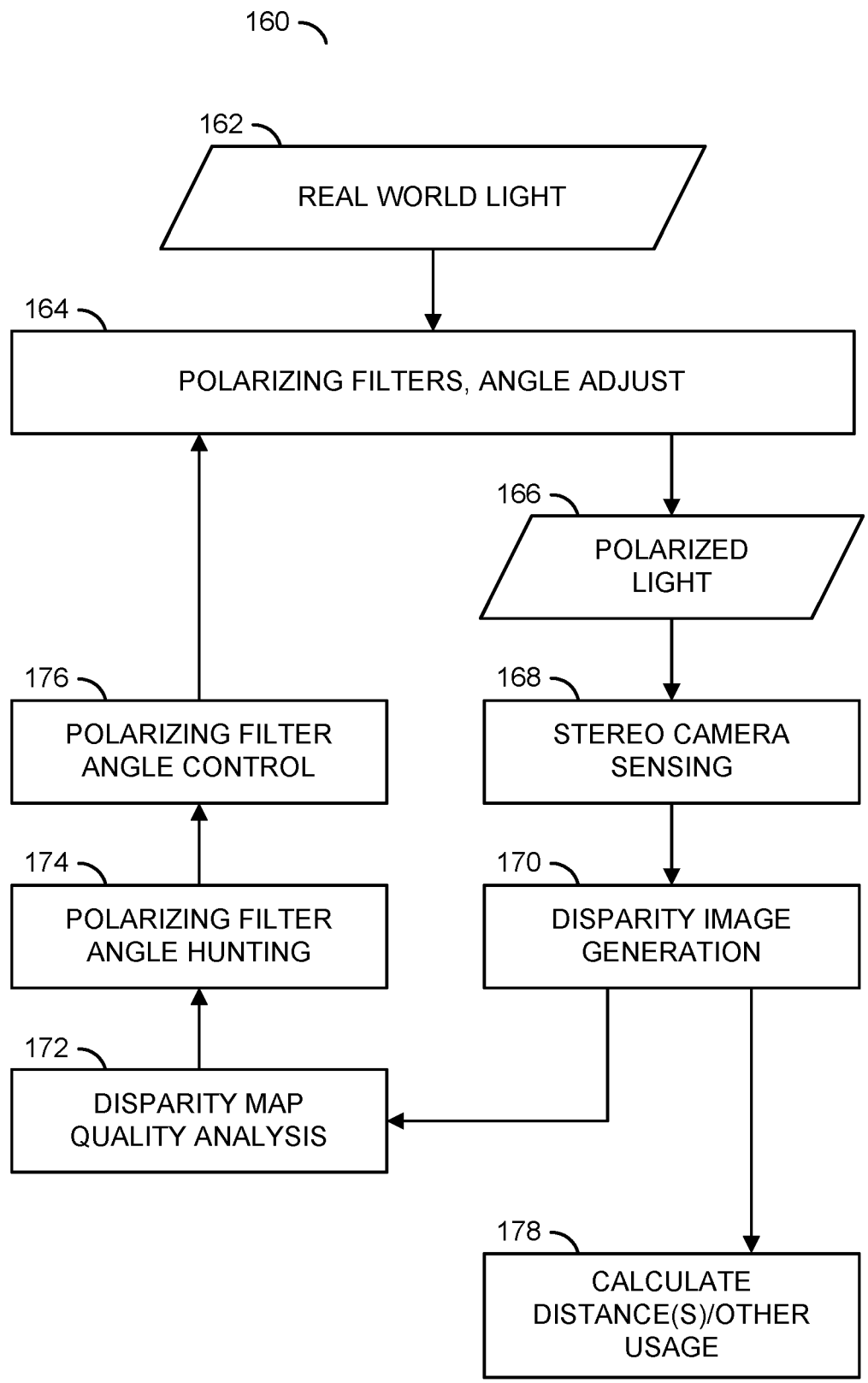
FIG. 5 is a flow diagram illustrating a method of operation of the camera system in accordance with an example embodiment of the invention.

Referring to FIG. 5, a flow diagram illustrating an example method 160 of operation is shown in accordance with an example embodiment of the invention. The method (or process) may be performed by the camera system 100. The method 160 generally comprises a step (or state) 162, a step (or state) 164, a step (or state) 166, a step (or state) 168, a step (or state) 170, decision step (or state) 172, a step (or state) 174, a step (or state) 176 and a step (or state) 178. The sequence of the steps 162 to 178 is shown as a representative example. Other step orders may be implemented to meet the criteria of a particular application.

In the step 162, the circuit 102 may receive the light signal L from the real world. The light signal L may pass through the optical filters 116a-116b rotated to a current angle in the step 164. The optical filters 116a-116b may polarize the light signal L in a direction based on the current angle of the optical filters 116a-116b in the step 166.

In the step 168, the circuit 110 may sense the polarized light in the signal L. The circuit 110 generally converts the sensed light into multiple (e.g., two) sequences of images in the electrical signal S. In the step 170, the circuit 104 may generate a sequence of disparity images from the images created by the circuit 110.

A quality analysis of disparity maps created from the disparity images may be performed in the step 172. The quality analysis may measure a density of the disparity maps and continuity of a converted depth model generated from the disparity images to determine disparity quality analysis scores. When generating the disparity images, a mismatch (or invalid match) may exist when targeting to the reflecting surface 86 (e.g., the puddle or a windshield). By checking the density of the disparity images (e.g., how many points can be correlated between the two images), the quality may be determined to be improving or degrading as the angle of the optical filters 116a-116b is adjusted.

The circuit 104 may perform an angle hunting technique (or method, or process) in the step 174 in an attempt to improve the quality in response to the disparity quality analysis scores. As the environment may be constantly changing, the angle hunting technique may always be running to try to find a better angle for the optical filters 116a-116b to get a better disparity quality analysis score. Even if a better score cannot be found because the disparity quality analysis score at a local maximum, the circuit 104 may continue to run the angle hunting technique as the best angle may change when the environment changes. In various embodiments, the angle hunting technique may be implemented as a gradient descent technique. Other angle hunting techniques may be implemented to meet the design criteria of a particular application.

In the step 176, the circuit 104 may generate motor control commands in the signal M to change the angle of the optical filters 116a-116b based on a result of the angle hunting technique. The motor control commands may be presented to the circuit 102. In the step 164, the motor 118 may update the rotational angle of the optical filters 116a-116b in response to the motor control command. The method 160 may continue around the loop of steps 164 to 176 while the camera system 100 is operational.

After the disparity images have been generated in the step 170, the circuit 104 may also calculate one or more distances to the points of interest in the disparity images in the step 178. The distances and/or the disparity images may subsequently be presented in the signal P to the circuit 106. Other uses of the distances and/or the disparity images may be included in the step 178.

Figure 6:
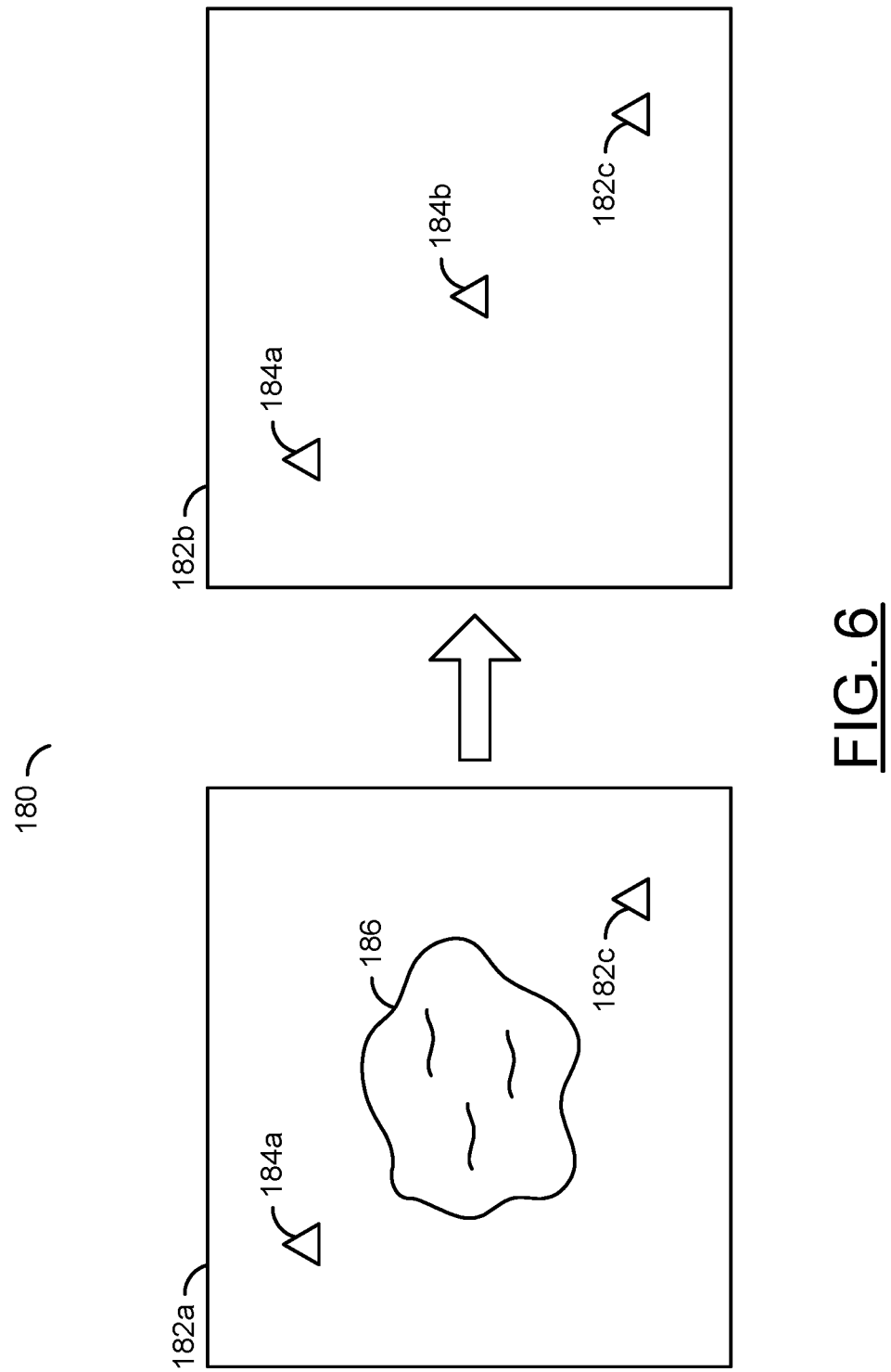
FIG. 6 is a diagram illustrating sensed images in accordance with an example embodiment of the invention.

Referring to FIG. 6, a diagram illustrating an example adjustment 180 of the sensed images is shown in accordance with an example embodiment of the invention. An initial image 182a of the surface 86 may be sensed by the camera system 100 with the optical filters 116a-116 at an initial angle. The initial image 182a may include multiple points of interest 184a-184c. However, a reflection 186 caused by the surface 86 may blur or obscure the point of interest 184b.

The optical filters 116a-116b may be rotated to a final angle to improve the sensed image. A final image 182b of the surface 86 may be sensed where the final angle allows the optical filters 116a-116b to reduce or remove the reflection 186. With the reflection 186 reduced or removed, the central point of interest 184b may be clearly visible in the final image 182b. Subsequently, the camera system 100 may accurately estimate a distance to the point of interest 184b.

The functions performed by the diagrams of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a plurality of optical filters configured to (i) generate polarized light by polarizing light received from a reflective surface and (ii) rotate in synchronization to each other;
   a stereo camera disposed adjacent said optical filters and configured to generate two sequences of images in electrical form from said polarized light; and
   a circuit configured to (i) generate a sequence of disparity images from said two sequences of images and (ii) adjust said rotation of said optical filters in response to said sequence of disparity images.

2. The apparatus according to claim 1, wherein said circuit is further configured to calculate a distance based on at least one disparity image from said sequence of disparity images.

3. The apparatus according to claim 1, wherein said rotation is adjusted based on a hunting technique performed on said sequence of disparity images.

4. The apparatus according to claim 3, wherein said hunting technique is based on a quality analysis of said sequence of disparity images.

5. The apparatus according to claim 3, wherein said hunting technique is a gradient descent technique.

6. The apparatus according to claim 1, further comprising the step of:
   generating a control signal based on said sequence of disparity images.

7. The apparatus according to claim 6, wherein said optical filters are rotated in response to said control signal.

8. The apparatus according to claim 1, wherein said optical filters are coplanar.

9. The apparatus according to claim 1, wherein said optical filters, said stereo camera and said circuit are implemented in a mobile vehicle.

10. A method for stereoscopic distance measurement, comprising the steps of:
    generating polarized light by polarizing light received from a reflecting surface using two optical filters;
    generating two sequences of images in electrical form from said polarized light using a stereo camera disposed adjacent to said optical filters;
    rotating said optical filters in synchronization to each other;
    generating a sequence of disparity images from said two sequences of images; and
    adjusting said rotation of said optical filters in response to said sequence of disparity images.

11. The method according to claim 10, further comprising the step of:
    calculating a distance based on at least one disparity image from said sequence of disparity images.

12. The method according to claim 10, wherein said rotation is adjusted based on a hunting technique performed on said sequence of disparity images.

13. The method according to claim 12, wherein said hunting technique is based on a quality analysis of said sequence of disparity images.

14. The method according to claim 12, wherein said hunting technique is a gradient descent technique.

15. The method according to claim 10, further comprising the step of:
    generating a control signal based on said sequence of disparity images.

16. The method according to claim 15, wherein said optical filters are rotated in response to said control signal.

17. The method according to claim 10, wherein said optical filters are coplanar.

18. The method according to claim 10, wherein the steps are implemented in a mobile vehicle.

* * * * *